(12) United States Patent
Charagulla (10) Patent No.: US 7,152,136 B1
(45) Date of Patent: Dec. 19, 2006

(54) IMPLEMENTATION OF PCI EXPRESS

(75) Inventor: Sanjay Charagulla, San Jose, CA (US)

(73) Assignee: Altera Corporation, San Jose, CA (US)

( * ) Notice: Subject to any disclaimer, the term of this patent is extended or adjusted under 35 U.S.C. 154(b) by 207 days.

(21) Appl. No.: 10/911,212

(22) Filed: Aug. 3, 2004

(51) Int. Cl.
*G06F 13/14* (2006.01)
*G06F 13/12* (2006.01)
*H04J 3/16* (2006.01)

(52) U.S. Cl. .................. 710/315; 710/305; 710/72; 710/62; 711/103; 370/469

(58) Field of Classification Search ............... 710/260
See application file for complete search history.

(56) References Cited

U.S. PATENT DOCUMENTS

| | | | | |
|---|---|---|---|---|
| 6,976,102 | B1* | 12/2005 | Groen et al. ............... | 710/72 |
| 7,020,729 | B1* | 3/2006 | Taborek et al. ............ | 710/305 |
| 7,080,190 | B1* | 7/2006 | Weber ....................... | 710/315 |
| 2005/0066085 | A1* | 3/2005 | Kobayashi ................. | 710/62 |
| 2005/0120163 | A1* | 6/2005 | Chou et al. ................ | 711/103 |
| 2005/0259685 | A1* | 11/2005 | Chang et al. .............. | 370/469 |

OTHER PUBLICATIONS

XILINX—RocketIO Transceiver Bit-Error Rate Tester—Feb. 12, 2004.*
Burney, et al., "Embedded PCI-Express Implementation", Altera Corporation, U.S. Appl. No. 10/964,979, filed Oct. 13, 2004, pp. 1-38.
StorageTek: The leader in Information lifecycle management solutions, http://www.storagetek.com/, printed on Aug. 3, 2005, 1 page.
Bhatt, Ajay V., "Creating a Third Generation I/O Interconnect", Intel® Developer Network for PCI Express* Architecture, www.express-lane.org, pp. 1-11.
PCI Express, PCI Express Core Getting Started: Xilinx, Version 1.4.2, Apr. 2005, Copyright © PLDApplications 1996-2005.

* cited by examiner

*Primary Examiner*—Rehana Perveen
*Assistant Examiner*—Brian Misiura
(74) *Attorney, Agent, or Firm*—Beyer Weaver & Thomas, LLP (57) ABSTRACT

Methods and apparatus are provided for providing PCI Express support. A device includes a hard-coded transceiver configured to support protocols such as Fibre Channel and the 10 Gigabit Attachment Unit Interface (XAUI), but the transceiver does not fully support PCI Express. Interface circuitry is configured to supplement or replace hard-coded transceiver components to provide PCI Express support. Interface circuitry allows PCI Express cores to operate with the transceiver that does not fully support PCI Express.

26 Claims, 9 Drawing Sheets

| Feature 501 | Transceiver 503 | Interference Logic 505 |
|---|---|---|
| Comma Detection 505 | Yes | / |
| 8b 10b Encoding/Decoding 513 | Partial | Yes |
| Elastic Buffer 515 | Yes | / |
| Error + Status Reporting 517 | No | Yes |

IMPLEMENTATION OF PCI EXPRESS

BACKGROUND OF THE INVENTION

1. Field of the Invention

The present invention relates to supporting PCI Express. In one example, the present invention relates to methods and apparatus for implementing interface circuitry allowing PCI Express cores to operate with a transceiver not compatiable with PCI Express.

2. Description of Related Art

PCI Express is a low-cost, scalable, switched, point-to-point, serial I/O interconnection scheme that maintains backward compatibility with PCI. PCI Express provides a number of benefits over existing bus standards, including increased bandwidth availability and support for real-time data transfer services. PCI Express provides quality of service, power management, and I/O virtualization features. Quality of service and power management improve data integrity and allow control of power consumption. I/O virtualization allows data to be routed along logical routes, permits allocation of bandwidth to groups of devices, and provides the ability to prioritize traffic streams.

Although PCI Express is expected to gain wider acceptance, adoption may be gradual as a large number of existing devices are configured for use with PCI and not PCI Express. For example, programmable chips are often configured with hard-coded transceivers that are not fully compatible with PCI Express. Although PCI Express intellectual property cores may be available to handle link layer operations and higher layer operations, the cores can not necessarily operate with a transceiver does not support PCI Express. Also some Application Specific Standard Products (ASSPs) and Application Specific Integrated Circuits (ASICs) that have some programmability may also include transceiver circuitry that does not fully support PCI Express.

Consequently, it is desirable to provide improved techniques and mechanisms for providing PCI Express support for transceivers that are not fully compatible with PCI Express.

SUMMARY OF THE INVENTION

Methods and apparatus are provided for providing PCI Express support. A device includes a hard-coded transceiver configured to support protocols such as Fibre Channel and the 10 Gigabit Attachment Unit Interface (XAUI), but the transceiver does not fully support PCI Express. Interface circuitry is configured to supplement or replace hard-coded transceiver components to provide PCI Express support. Interface circuitry allows PCI Express cores to operate with the transceiver that does not fully support PCI Express.

In one embodiment, a programmable chip is provided. In one example, the programmable chip includes hard-coded transceiver circuitry, a PCI Express core, and interface circuitry. The hard-coded transceiver circuitry includes an 8b/10b encoder/decoder. The hard-coded transceiver circuitry is PCI Express incompatible. The PCI Express core is configured to perform operations associated with a PCI Express link layer. Interface circuitry couples the hard-coded transceiver circuitry to the PCI Express core. The interface circuitry includes an augmented 8b/10b encoder/decoder.

In another embodiment, a transceiver device is provided. The transceiver device includes hard-coded transceiver circuitry, soft-coded transceiver logic, and interface circuitry. The hard-coded transceiver circuitry is implemented on a programmable chip. The hard-coded transceiver circuitry is configured to implement a transceiver physical layer. The transceiver physical layer is PCI Express incompatible. The soft-coded transceiver logic is implemented on the programmable chip. The soft logic is configured to implement a transceiver link layer. The transceiver link layer is PCI Express incompatible. Interface circuitry couples the hard-coded transceiver circuitry to the soft-coded transceiver logic. The interface circuitry is configured to support PCI Express features not supported by the hard-coded transceiver circuitry.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of standards and devices.

However, it should be noted that the techniques of the present invention can be applied to a variety of bus types and devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

The peripheral components interface (PCI) bus is an input/output (I/O) mechanism that allows the interconnection of system components and interfaces, such as processors, memory, timers, hardware accelerators, and network devices. PCI includes a number of advantages over previous bus implementations. PCI has processor independence, and is not tied to any particular processor family or version. PCI supports buffered isolation that essentially isolates, both electrically and by clock domains, the processor bus from the PCI bus. This allows the running of concurrent cycles on the PCI bus and the processor bus while also allowing increases in processor local bus frequency independent of PCI bus speed. The PCI bus supports bus mastering, allowing master components to gain access to the PCI bus through an arbitration process and control a particular slave device directly, as opposed to waiting for the host processor to service the device. Plug-and-play operation is also supported. Plug-and-play operation permits devices to be automatically detected and configured, eliminating the need to manually set switches and jumpers for base addresses and interrupts.

Although PCI has gained wide acceptance, PCI also has a number of limitations. PCI is a synchronously clocked, parallel bus scheme that requires rigid timing alignment. Consequently, while processors and other components have increased clock speeds by many orders of magnitude, PCI remains largely locked to its near original clock frequency. PCI bandwidth limitations, pin-count limitations as well as lack of support for real-time data transfer services. Applications such as high speed data transfers and multimedia applications require guaranteed bandwidth and deterministic latency. PCI also lacks quality of service, power management, and I/O virtualization features. Quality of service and power management improve data integrity and allow control of power consumption. I/O virtualization allows data to be routed along logical routes, permits allocation of bandwidth to groups of devices, and provides the ability to prioritize traffic streams. A core limitation of PCI, however, is that all available bandwidth is shared by all components connected to the bus. In many instances, a single device can consume all of the available bandwidth on a PCI bus.

The limitations of PCI have led to the development of a number of newer interconnection standards, including PCI Express, formerly known as 3GIO or third generation I/O. PCI Express is a low-cost, scalable, switched, point-to-point, serial I/O interconnection scheme that maintains backward compatibility with PCI. The PCI Express architecture is specified using an Open System Interconnection (OSI) layer model and uses a load-store addressing architecture with a flat address space to allow interoperability with existing PCI applications. The software layers generate read and write requests that are transported by the transaction layer to the I/O devices using a packet-based, split-transaction protocol. The link layer adds sequence numbers and CRC to these packets to create a highly reliable data transfer mechanism. The basic physical layer includes a dual simplex channel that is implemented as a transmit pair and a receive pair.

Although PCI Express is expected to gain wider acceptance, adoption may be gradual as a large number of existing devices are configured for use with PCI and not PCI Express. For example, programmable chips are often configured with hard-coded transceivers that are not fully compatible with PCI Express. Any circuitry implemented on a device for a specific purpose without programmability to optimize performance is referred to herein as hard-coded circuitry. In many examples, the hard-coded transceivers handle many physical layer operations and some link layer operations associated with the PCI Express architecture. Programmable logic and/or software is used to handle higher layer operations. Although PCI Express intellectual property cores may be available to handle link layer operations and higher layer operations, the cores can not necessarily operate with a transceiver that does not support PCI Express. Some Application Specific Standard Products (ASSPs) and Application Specific Integrated Circuits (ASICs) that have some programmability may also include transceivers that do not fully support PCI Express.

Consequently, the techniques and mechanisms of the present invention provide interface circuitry that provides devices with PCI Express support. Any logic or mechanism that provides devices with transceivers that do not fully support PCI Express with PCI Express support is referred to herein as interface and wrapper logic or interface and wrapper circuitry. In some examples, interface circuitry is provided with devices that have a hard-coded transceiver to allow a PCI Express intellectual property core to operate with a conventional transceiver. Any transceiver that does not support PCI Express is referred to herein as a PCI Express incompatible transceiver. In some examples, the PCI Express incompatible transceiver supports XAUI and Fibre Channel. Interface circuitry can perform physical layer and link layer operations to supplement transceiver functionality.

Figure 1:
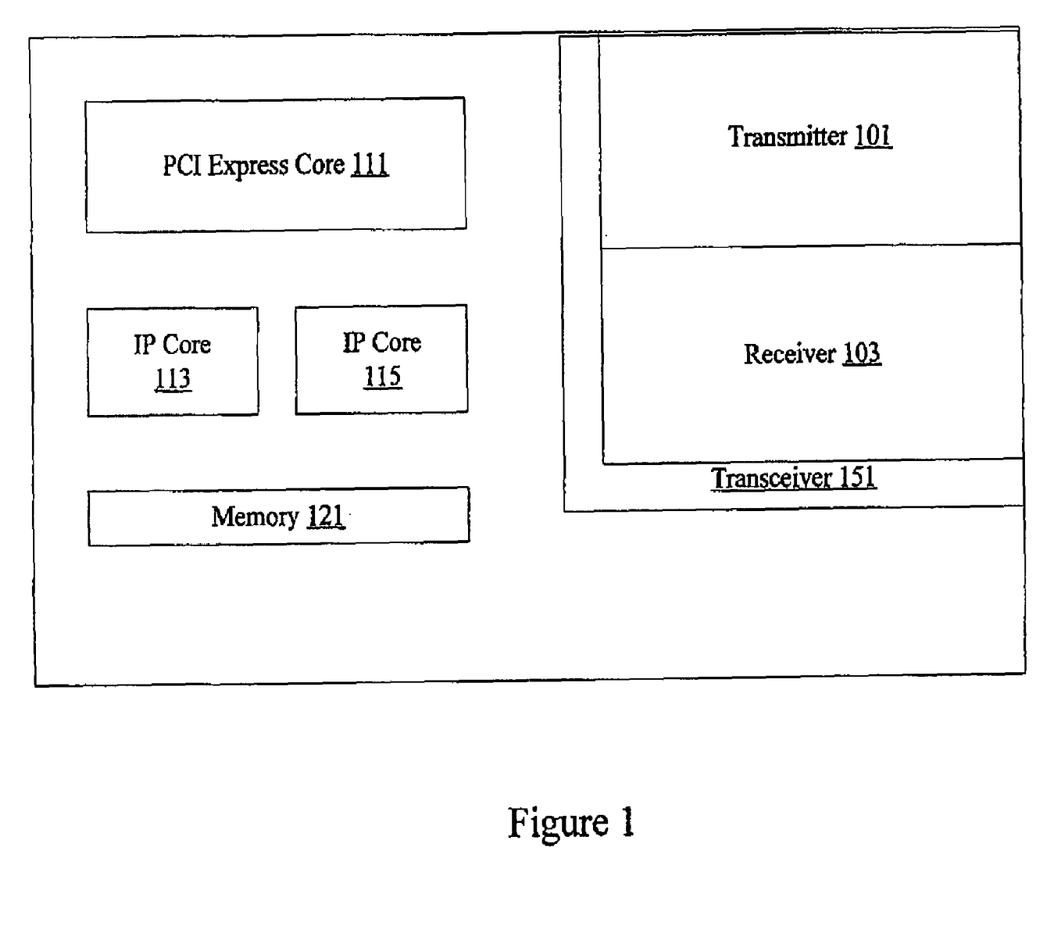
FIG. 1 is a diagrammatic representation of a programmable chip that can be used to implement the techniques and mechanisms of the present invention.

FIG. 1 is a diagrammatic representation showing one example of a programmable chip having a hard-coded transceiver. Although a programmable chip is shown, the techniques of the present invention may be applicable to ASSPs and ASICs as well. According to various embodiments, the system includes a PCI Express core 111, memory 121, a hard-coded transceiver 151 including transmitter 101 and receiver 103, as well as other IP cores 113 and 115. In some examples, the programmable chip can also include a processor, a hardware accelerator, and a timer. A variety of components including primary and slave components can be included. It should be noted that the system can include both on-chip memory 121 and off-chip memory.

The programmable chip has a hard-coded transceiver that may be used to support a variety of transmission standards. The programmable chip also has different types of resources that can be used interchangeably in different allocations to implement components on the programmable chip. In one example, the programmable chip has hardwired circuitry for the built in transceiver and uses logic elements for implementing each of the various cores on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of lookup tables and switches for performing Boolean operations on input lines. In one example, a logic element includes a 16-bit SRAM lookup table (LUT)

that can implement an arbitrary 4-input logic function, circuitry that forms a fast carry chain and a fast cascade chain, a register and preset/reset logic for the register. In other examples, a logic element is an adaptive logic module (ALM) that provides 8 inputs, allowing it to efficiently support various configurations such as 6-input or 7-input lookup tables or two independent 4-input lookup tables.

Figure 2:
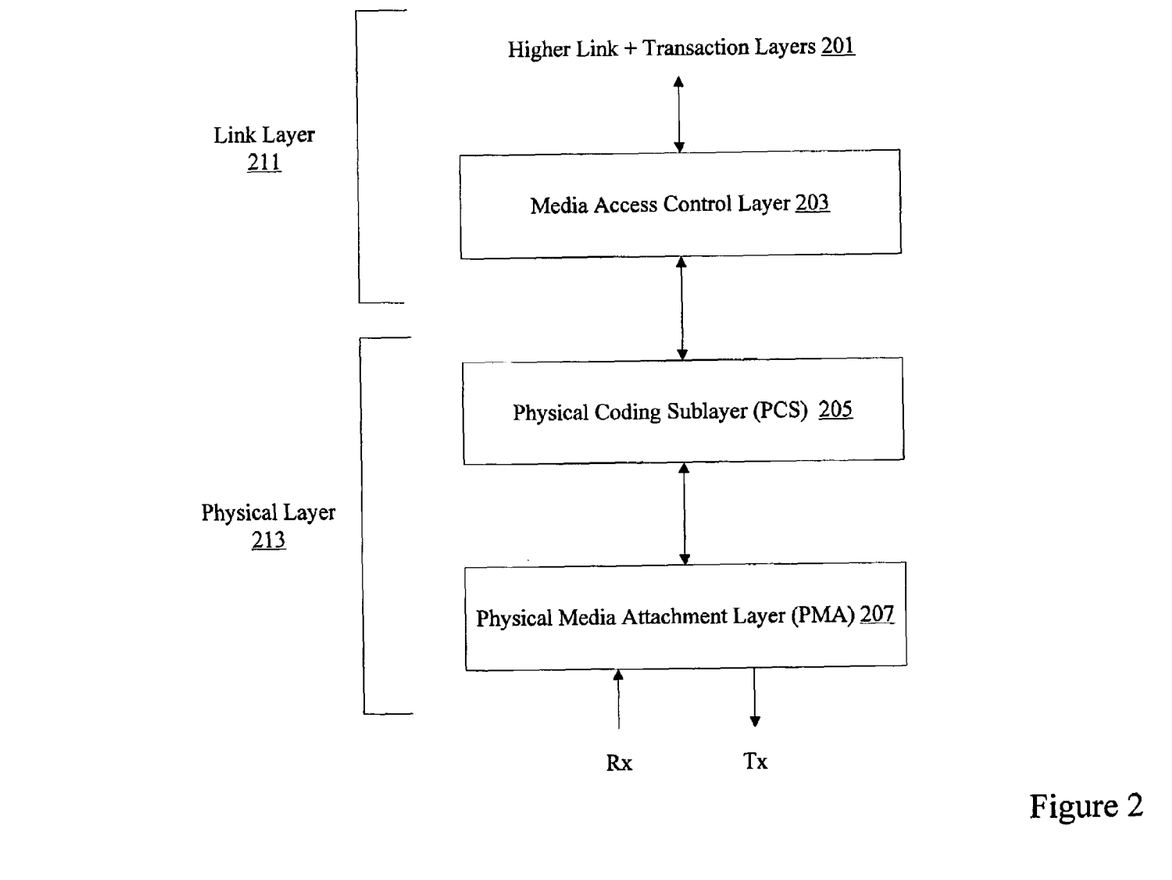
FIG. 2 is a diagrammatic representation showing a PCI Express system level implementation.

FIG. 2 is a diagrammatic representation of an example of a PCI Express layer model. PCI Express includes a physical layer 213 having a Physical Coding Sublayer (PCS) 205 and a Physical Media Attachment Layer (PMA) 207. A PCI Express link typically includes two low-voltage AC-coupled differential pairs of signals (a transmit pair and a receive pair). The physical link signal uses a de-emphasis scheme to reduce intersymbol interference, thus improving data integrity. A data clock is embedded using the 8b/10b encoding scheme to achieve high data rates. The physical layer transports packets between the link layers of two PCI Express agents.

The link layer 211 includes Media Access Control Layer 203. The link layer primarily provides reliable delivery of packets across a PCI Express link. The link layer is responsible for data integrity and adds a sequence number and checksum information (CRC) to the transaction layer packet.

Higher link and transaction layers 201 are also used. Most packets are initiated at the transaction layer. A credit-based, flow control protocol is used to ensure that packets are transmitted only when buffer space is available. The link layer will automatically retransmit a corrupted or dropped packet. The transaction layer receives read and write requests from the software layer and creates request packets for transmission to the link layer. The transaction layer also receives response packets from the link layer and matches these with the original software requests. Each packet has an identifier that enables response packets to be directed to the correct originator. Packets can also have attributes such as "no-snoop," "relaxed ordering" and "priority," which may be used to route packets optimally through an I/O subsystem.

Figure 3:
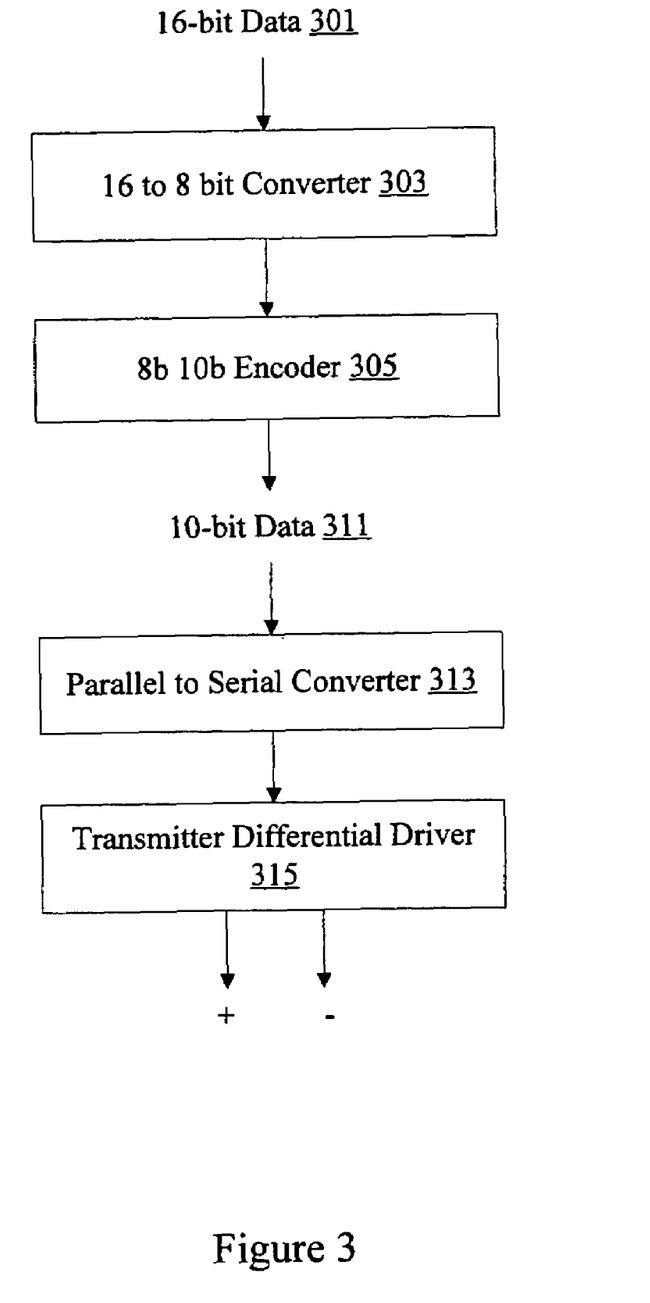
FIG. 3 is a diagrammatic representation showing a PCI Express transmitter.

FIG. 3 is a diagrammatic representation showing a PCI Express transmitter. According to various embodiments, 16-bit data 301 is passed to a 16-bit to 8-bit converter 303. It should be noted that although 16-bit data is provided, data of various lengths can be transmitted in a similar manner. The 8-bit data can then be converted to a 10-bit format using an 8b/10b encoder 305. 8b/10b encoding balances zeros and ones in a data stream to increase signal integrity. Although PCI Express incompatible transceivers often have 8b/10b encoders, transceivers typically do not support the full set of codes required for PCI Express compliance. Consequently, mechanisms are needed to fully support the 8b/10b code set using an augmented 8b/10b encoder. Any encoder supporting substantially the full set of codes required for PCI Express compliance is referred to herein as an augmented 8b/10b encoder.

In some examples, the augmented 8b/10b encoder replaces the encoder provided by a hard-coded transceiver. In other examples, the augmented 8b/10b encoder performs operations on particular codes. 10-bit data 311 is then passed to a parallel to serial converter 313. The transmitter differential driver 315 is then used to send the data. According to various embodiments, PCI Express requires the transmitter to be able to force negative disparity in 8b/10b encoding. However, some transceivers are only able to force positive disparity. The inclusion of 8b/10b encoder allows the selection of negative disparity in compliance with the PCI Express specification.

The PCI Express specification also requires that the transmitter support a steady-state condition in which the transmitter and receiver voltages are held constant. The status is primarily used in power savings and common mode initialization. In order to use this state, transceivers are required to generate and recognize particular electrical idle ordered sets. In one example, the electrical idle order set includes a K28.5 (COM) followed by three K28.3 (IDL) symbols. In one example, a symbol such as a K28.5 symbol is 0011111010 with a disparity of 0 and 1100000101 with a disparity of 1. However, PCI Express incompatible transceivers typically do not recognize these symbols. Consequently, the techniques of the present invention provide mechanisms for handling transmission and receipt of electrical idle ordered sets. In some embodiments, interface circuitry is provided to ignore electrical idle ordered sets when received and indicate to other devices that they should not send any electrical idle ordered sets to the receiver.

Figure 4:
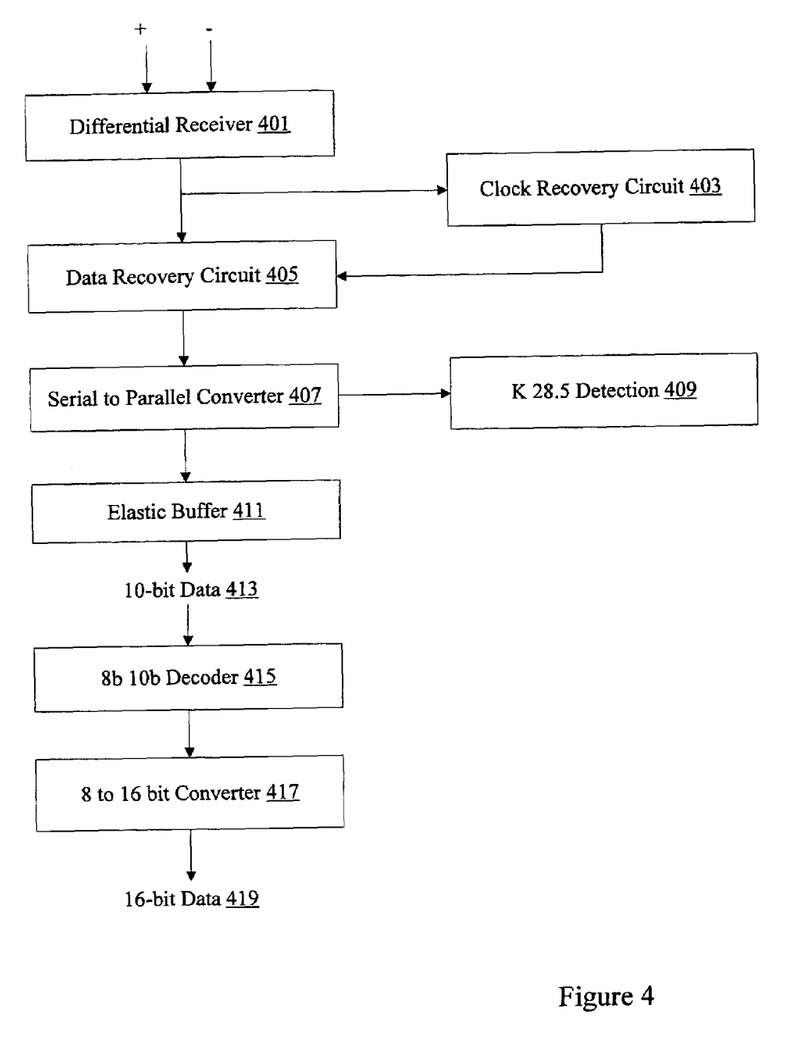
FIG. 4 is a diagrammatic representation showing a PCI Express receiver.

FIG. 4 is a diagrammatic representation showing one example of a PCI Express receiver. The differential receiver 401 is coupled to a clock recovery circuit 403 and a data recovery circuit 405. The clock and data recovery units 403 and 405 extract clock information from the incoming serial data stream. The recovered clock is then used to sample the serial data stream and clock the deserializer 407. Receive data and clock information is passed to the serial to parallel converter/deserializer 407. The deserializer 407 converts the incoming high-speed serial data stream to a lower-speed parallel interface such as an 8-, 10-, 16-, or 20-bit parallel interface. K28.5 detection is performed at 409. An elastic buffer 411 provides 10-bit data 413 to an 8b/10b decoder 415. An optional 8-bit to 16-bit converter 417 provides 16-bit data 419. According to various embodiments, transceivers typically do not support Rx polarity inversion. Consequently, interface circuitry or wrapper logic enables the inversion to be performed on the data before it goes into the 8b/10b decoder.

Figure 5:
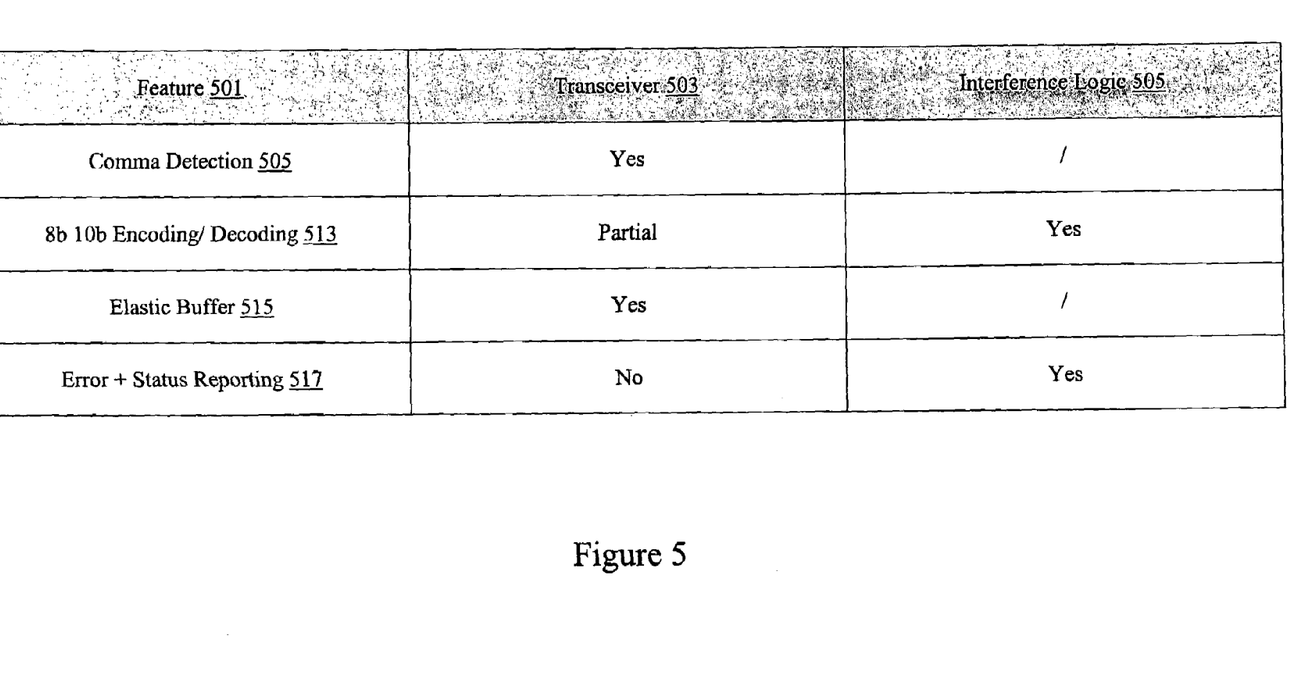
FIG. 5 is a table representation showing an example of functionality not support by a transceiver.

FIG. 5 is a table representation showing features supported by one example of a transceiver. According to various embodiments, the features not supported by a transceiver 503 are supported by interface logic 505. In one example, transceiver 503 supports comma detection 511, provides an elastic buffer 515, and provides partial 8b/10b encoding and decoding 513. A transceiver 503 however does not support any error status reporting 517. According to various embodiments, comma detection 511 allows a transceiver to detect idle states. The elastic buffer is used to compensate for differences in frequencies between bit rates at the two ends of a link. In some examples, the elastic buffer can store at least seven symbols to handle frequency and interval differences. Error and status codes can include some of the following:

0, 0, 0: Received data OK
0, 0, 1: 1 SKP added
0, 1, 0: 1 SKP removed
0, 1, 1: Receiver detected
1, 0, 0: 8B/10B decode error
1, 0, 1: Elastic Buffer overflow
1, 1, 0: Elastic Buffer underflow Because the built in transceiver does not fully support PCI Express, interface logic 505 is provided to handle cases the transceiver can not. In one example, a transceiver is hard-coded on a programmable chip. Interface logic 505, however, can be configured using programmable logic. Interface logic 505 allows a transceiver to interact with PCI Express cores. PCI Express interface logic can provide support for 8b/10b encoding 513 while also supporting error and status reporting 517. In some examples, interface logic 505 performs 8b/10b encoding/decoding while the 8b/10b encoder/decoder hard-coded as part of the transceiver is left unused. In other examples, interface logic 505 handles particular encodes and decodes while the transceiver 503 handles other encodes and decodes.

Figure 6:
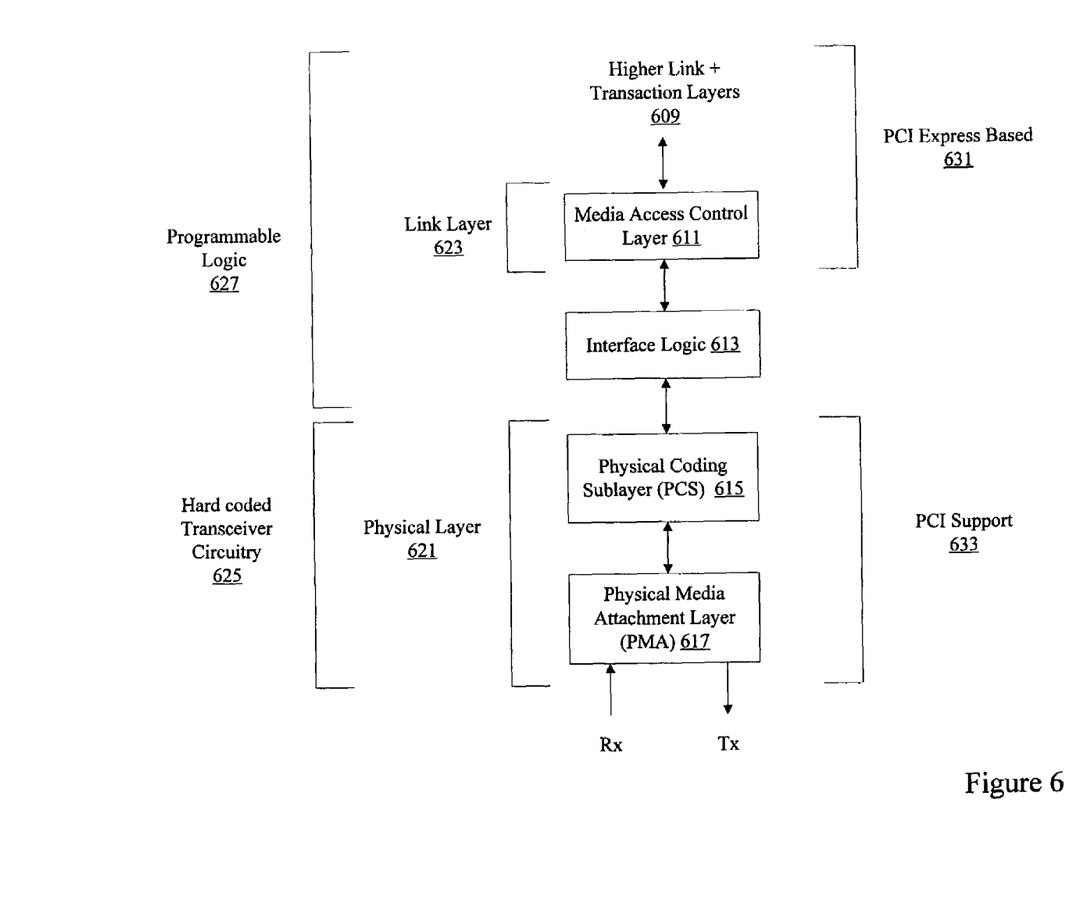
FIG. 6 is a diagrammatic representation showing a PCI Express system level implementation with interface circuitry.

FIG. 6 is a diagrammatic representation of one example of a PCI Express architecture using interface logic. Hard coated transceiver circuitry 625 is primarily configured to perform physical layer 621 operations, although some operations associated with other layers may also be performed. The physical layer 621 includes the physical coating sublayer (PCS) 615 and the physical media attachment layer (PMA) 617. According to various embodiments, hard coded transceiver circuitry 625 is PCI Express incompatible. According to various embodiments, programmable logic 627 provides support for a link layer 623, although operations associated with other layers may also be supported. A link layer 623 includes media access control layer 611 coupled to higher link and transaction layers 609. In one example, programmable logic 627 is a PCI Express core. The PCI Express core may be provided from a standard programmable logic library. The intellectual property core is PCI Express 631 based and typically could not run on a hard-coded transceiver.

Consequently, the techniques of the present invention provide interface logic 613 to make the PCI Express programmable logic core compatible with a transceiver. Interface logic 613 may perform a variety of physical layer 621, link layer 623, and/or other operations. The operations may replace operations performed by the built in transceiver or may supplement transceiver components. PCI support 633 is also provided.

Figure 7:
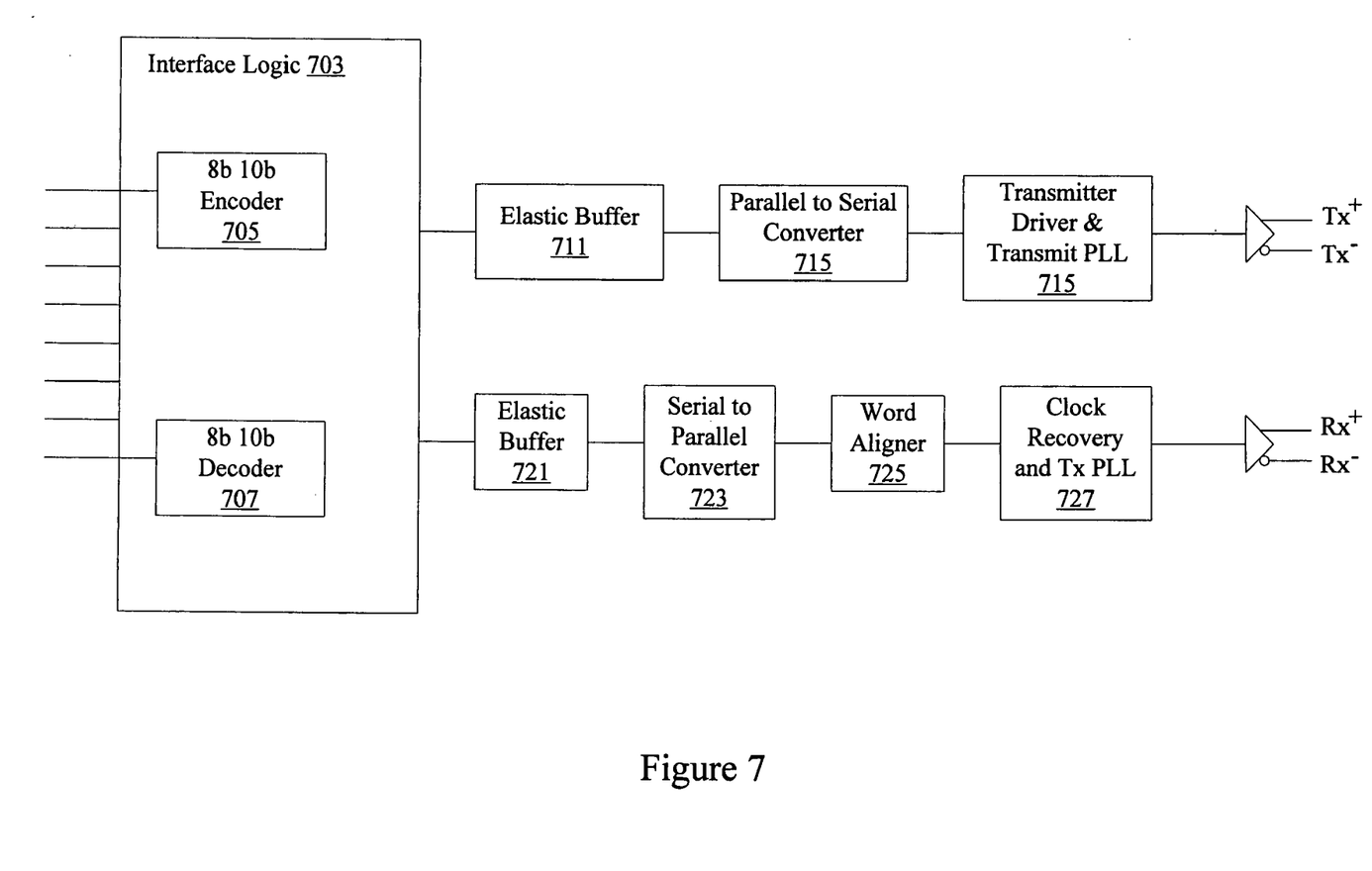
FIG. 7 is a diagrammatic representation showing a device including interface circuitry.

FIG. 7 is a diagrammatic representation of a transceiver having interface logic. According to various embodiments, interface logic 703 is coupled to a PCI Express core. Interface logic 703 includes an 8b/10b encoder and an 8b/10b decoder. The 8b/10b encoder is coupled to an elastic buffer 711 on the Tx side for phase compensation. Data passes to a parallel to serial converter 713 and is sent using a transmitter driver and a transmit phase lock loop 715. On the Rx side, data is passed to clock recovery circuitry and a receive phase locked loop 727. Word alignment is performed at 725 before serial to parallel conversion 723. An elastic buffer 721 is also hard-coded. An 8b/10b decoder 707 in interface logic 703 supports a full set of PCI Express 8b/10b codes. Interface logic 703 may also include other components.

Although the techniques and mechanisms of the present invention are applicable to a variety of different devices including general purpose processors, video accelerators, cryptography accelerators, digital signal processors, microcontrollers, etc., the techniques and mechanisms of the present invention are particularly applicable to devices with hard-coded transceivers. In one example, the wrapper and interface logic of the present invention of the present invention are implemented as soft logic on an Stratix GX device having a hard-coded transceiver. The Stratix GX device is available from Altera Corporation of San Jose, Calif.

Figure 8:
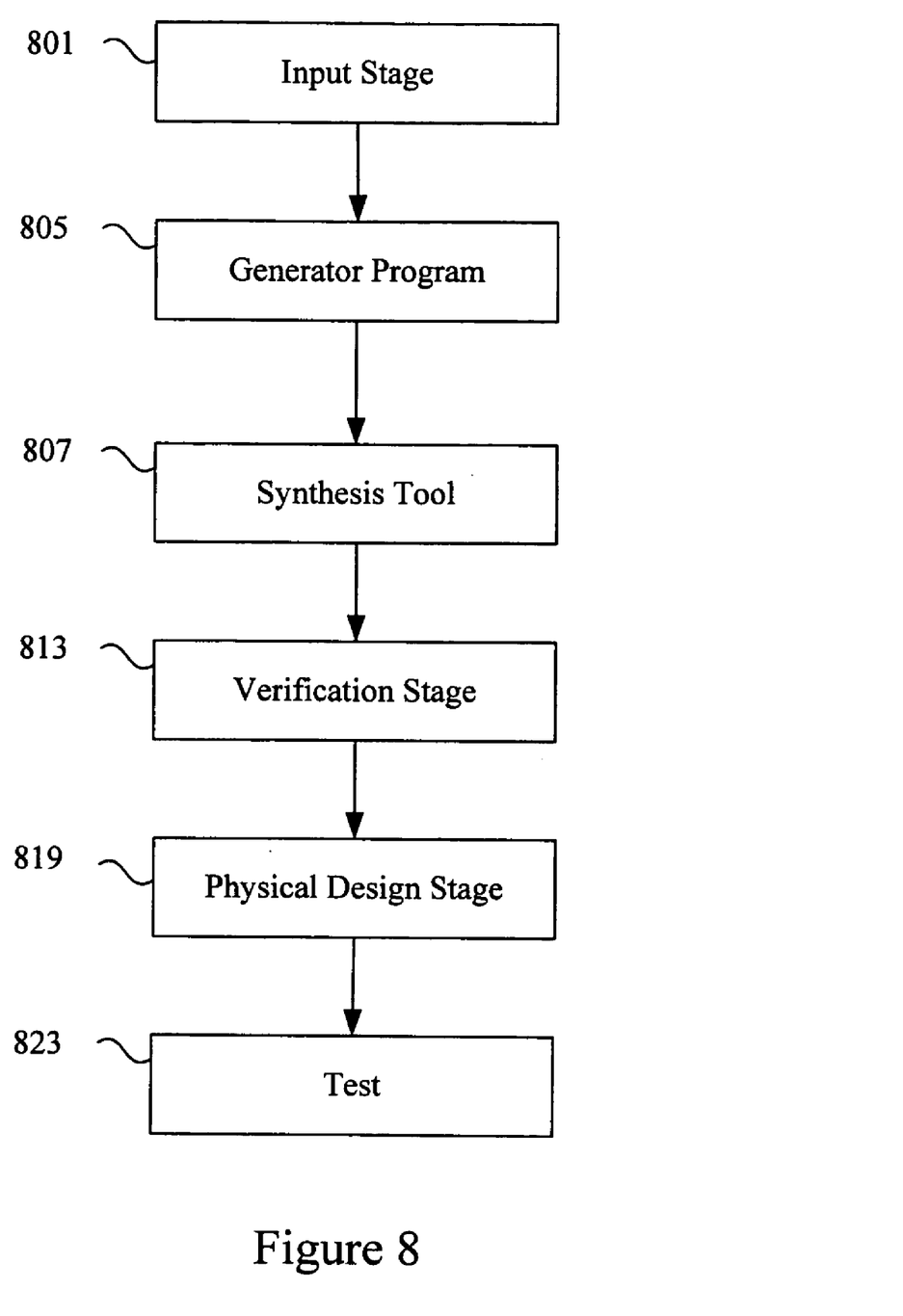
FIG. 8 is a diagrammatic representation showing a technique for implementing a programmable device.

FIG. 8 is a diagrammatic representation showing one example of implementing interface circuitry and a PCI Express core on a programmable chip. An input stage 801 receives selection information typically from a user for logic such as a processor core as well as other components such as a PCI Express core to be implemented on an electronic device. In one example, the input received is in the form of a high-level language program. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. For example, the input stage 801 allows configuration of variable or fixed latency support. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected.

In typical implementations, the generator program 805 can identify the selections and generate a logic description with information for implementing the various modules. The generator program 805 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 805 identifies pointers and provides ports for each pointer. One tool with generator program capabilities is System on a Programmable Chip (SOPC) Builder available from Altera Corporation of San Jose, Calif. The generator program 805 also provides information to a synthesis tool 807 to allow HDL files to be automatically synthesized. In some examples, a logic description is provided directly by a designer.

Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 809.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
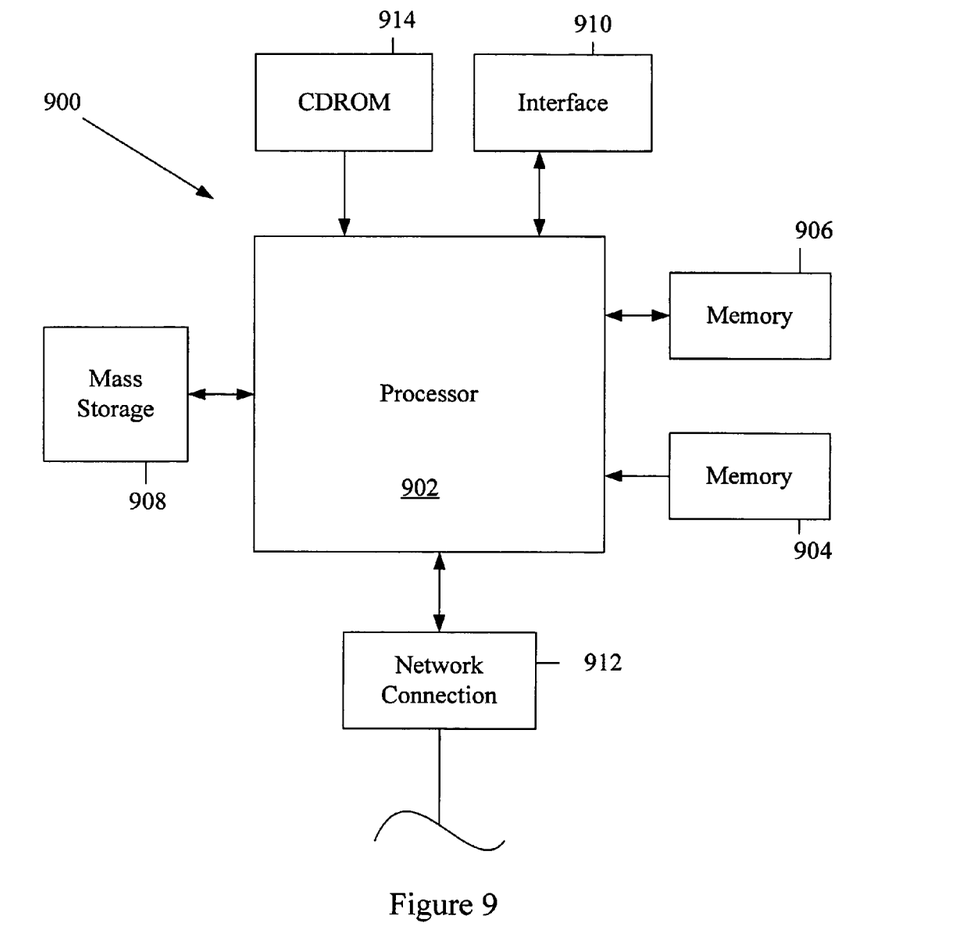
FIG. 9 is a diagrammatic representation showing a computer system.

FIG. 9 illustrates a typical computer system that can be used to implement a programmable chip. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate a test sequences for any designated processor. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of device associated with transceivers. It is therefore intended that the invention be interpreted to include all variations and equivalents that fall within the true spirit and scope of the present invention.

What is claimed is:

1. A programmable chip, comprising:
hard-coded transceiver circuitry including an 8b/10b encoder/decoder, wherein the hard-coded transceiver circuitry is PCI Express incompatible;
a PCI Express core configured to perform operations associated with a PCI Express link layer;
interface circuitry coupling the hard-coded transceiver circuitry to the PCI Express core, the interface circuitry including an augmented 8b/10b encoder/decoder; and
wherein the interface circuitry supports Rx polarity not supported by the hard-coded transceiver circuitry.

2. The programmable chip of claim 1, wherein the hard-coded transceiver circuitry includes a physical coding sublayer (PCS) and a physical media attachment layer (PMA).

3. The programmable chip of claim 2, wherein the hard-coded transceiver circuitry provides Rx detection, an elastic buffer, and 8b/10b encoding and decoding.

4. The programmable chip of claim 3, wherein the hard-coded transceiver circuitry further provides a serializer/deserializer.

5. The programmable chip of claim 1, wherein the PCI Express core is configured to implement link layer and network layer PCI Express operations.

6. The programmable chip of claim 5, wherein the PCI Express core is further configured to implement a PCI Express transport layer.

7. The programmable chip of claim 5, wherein the PCI Express core provides state machines for link training and status and also provides for lane—lane deskew.

8. The programmable chip of claim 1, wherein the interface circuitry supports full 8b/10b encoding and decoding Rx polarity not supported by the hard-coded transceiver circuitry.

9. A transceiver device, comprising:
hard-coded transceiver circuitry implemented on a programmable chip, the hard-coded transceiver circuitry configured to implement a transceiver physical layer, wherein the transceiver physical layer is PCI Express incompatible;
soft-coded transceiver logic implemented on the programmable chip, the soft logic configured to implement a transceiver link layer, wherein the transceiver link layer is PCI Express incompatible;
interface circuitry coupling the hard-coded transceiver circuitry to the soft-coded transceiver logic, the interface circuitry configured to support PCI Express features not supported by the hard-coded transceiver circuitry; and
wherein the interface circuitry supports Rx polarity not supported by the hard-coded transceiver circuitry.

10. The transceiver device of claim 9, wherein the transceiver physical layer includes a physical coding sublayer (PCS) and a physical media attachment layer (PMA).

11. The transceiver device of claim 10, wherein the physical coding sublayer provides Rx detection, an elastic buffer, and 8b/10b encoding and decoding.

12. The transceiver device of claim 10, wherein the interface circuitry provides 8b/10b encoding and decoding.

13. The transceiver device of claim 10, wherein the physical media attachment layer provides analog buffers and a serializer/deserializer.

14. The transceiver device of claim 9, wherein the transceiver link layer includes a media access control (MAC) layer.

15. The transceiver device of claim 14, wherein soft-coded transceiver logic is further configured to implement a network layer.

16. The transceiver device of claim 14, wherein soft-coded transceiver logic is further configured to implement a transport layer.

17. The transceiver device of claim 14, wherein the media access control layer provides state machines for link training and status and also provides for lane—lane deskew.

18. The transceiver device of claim 9, wherein the interface circuitry supports full 8b/10b encoding and decoding Rx polarity not supported by the hard-coded transceiver circuitry.

19. A programmable chip, comprising:
hard-coded transceiver means including an 8b/10b encoder/decoder, wherein the hard-coded transceiver means is PCI Express incompatible;
PCI Express core means for performing operations associated with a PCI Express link layer;
interface means for coupling the hard-coded transceiver means to the PCI Express core means, the interface means including an augmented 8b/10b encoder/decoder; and
wherein the interface means supports Rx polarity not supported by the hard-coded transceiver means.

20. The programmable chip of claim 19, wherein the hard-coded transceiver circuitry includes a physical coding sublayer (PCS) and a physical media attachment layer (PMA).

21. The programmable chip of claim 20, wherein the hard-coded transceiver means provides Rx detection, an elastic buffer, and 8b/10b encoding and decoding.

22. The programmable chip of claim 21, wherein the hard-coded transceiver means further provides a serializer/deserializer.

23. The programmable chip of claim 19, wherein the PCI Express core means is configured to implement link layer and network layer PCI Express operations.

24. The programmable chip of claim 23, wherein the PCI Express core means is further configured to implement a PCI Express transport layer.

25. The programmable chip of claim 23, wherein the PCI Express core means provides provides state machines for link training and status and also provides for lane—lane deskew.

26. The programmable chip of claim 19, wherein the interface means supports full 8b/10b encoding and decoding Rx polarity not supported by the hard-coded transceiver means.

* * * * *